United States Patent Office 2,741,646
Patented Apr. 10, 1956

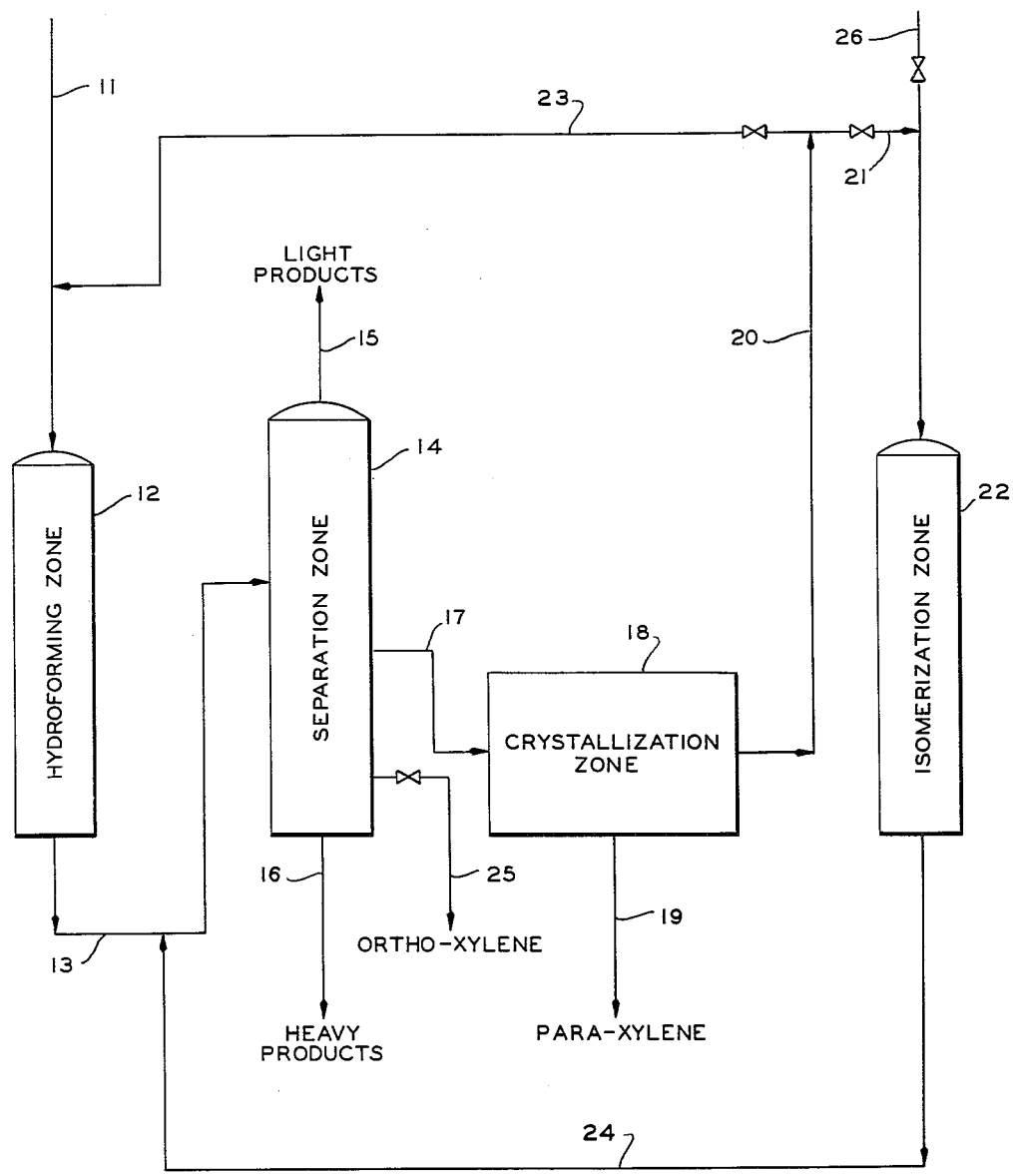

2,741,646

PRODUCTION OF XYLENES

Alfred Clark, Bartlesville, Okla., assignor to Phillips Petroleum Company, a corporation of Delaware Application April 7, 1953, Serial No. 347,358

11 Claims. (Cl. 260—668)

This invention relates to the production of xylenes. In one of its aspects, the invention relates to the production of para-xylene. In another of its aspects, the invention relates to the production of ortho-xylene. In another of its aspects, the invention relates to the production of para-xylene from a mixture of ortho- and meta-xylenes. In another of its aspects, the invention relates to the production of xylenes from a naphthenic hydrocarbon stream.

Para-xylene has for some time been an article of commerce. Hitherto, para-xylene was obtained from petroleum and coal tar xylene fractions, normally consisting essentially of ortho-, meta- and para-xylenes and ethyl benzene, the content of the para-xylene varying between 10 and 20 per cent. More recently, the development of synthetic fabrics such as "Dacron" has increased the demand for para-xylene to such an extent that the supply of naturally occurring xylenes is insufficient. Thus, considerable interest has been focused upon the preferential conversion of other hydrocarbons to para-xylene.

It has been known that the isomeric forms of xylene, namely the ortho-xylene, meta-xylene and para-xylene, can be converted one into the other by isomerization. However, that isomerization has been difficult to accomplish and when the isomerization has been carried out under conditions such as would give a relatively selective and clean cut isomerization, the reaction has taken place at such a slow rate as to make it impractical for commercial operation. Even when the isomerization was carried out under relatively drastic conditions leading to appreciable degradation of the product, the reaction was quite slow. The xylenes have been isomerized by purely thermal means and by treatment under certain conditions with Friedel-Crafts type catalyst, e. g., aluminum chloride plus hydrogen chloride, but the required conditions were severe, the reaction was slow and the yields were poor.

Further development of the isomerization of xylenes resulted in the use of clay type cracking catalysts. Preferred catalysts of that type have been the acid treated clays or synthetic materials composed largely of silica in combination with alumina, magnesia, zirconia or boric oxide.

A naphtha fraction boiling generally in the range of 150°–450° F., preferably in the range of 220°–300° F., is hydroformed in the presence of a supported reforming catalyst. Catalysts of the type which I prefer to use in the hydroforming chamber include such hydroforming catalysts as hydrogen fluoride treated alumina impregnated with minor portions of platinum or halogen or with molybdenum oxide, nickel, or a mixture of cobalt oxide and molybdenum oxide, and silica-alumina impregnated with like materials.

I prefer to use a hydrogen fluoride treated alumina catalyst impregnated with between 0.01 and 5 weight per cent platinum, preferably 0.1 to 1 weight per cent platinum. Another platinum catalyst which I use in this invention is platinum on silica-alumina which has previously been heated to reduce the surface area to within the range of 10–70 square meters per gram.

Hydroforming of the naphthenic feed is carried out in the presence of the above-identified catalysts at a temperature in the range of 700° F. to 1000° F., preferably 800° F. to 950° F. A pressure within the range of atmospheric to 1000 p. s. i. g., preferably 200–600 p. s. i. g., is utilized to obtain the selective formation of xylenes while operating at a liquid hourly space velocity of 0.3–10, preferably 0.5–6. A hydrogen to hydrocarbon mol ratio of between 0.5:1 to 20:1, preferably 1:1 to 10:1, is utilized.

Each of the objects of this invention will be attained by the aspects of this invention.

An object of this invention is to provide an improved process for the production of para-xylene. Another object of the invention is to provide a process for the production of para-xylene from a mixture of ortho- and meta-xylene. Another object of the invention is to provide a method for the production of ortho-xylene from mixtures of isomeric forms of xylene. Another object of the invention is to provide a method for the isomerization of ortho- and meta-xylenes in the presence of a specific silica-alumina catalyst to selectively produce para-xylene. Another object of the invention is to produce para-xylene from a selected fraction of naphthenic hydrocarbons. Other and further objects of this invention will be apparent to those skilled in the art upon study of the accompanying disclosure.

Broadly speaking, this invention comprises the selective production of para-xylene from a non-equilibrium xylene mixture, deficient in para-xylene, by contacting such a feed, which may also contain some ethylbenzene, with a bed of solid granular adsorbent contact catalyst consisting of synthetic silica gel, subsequently promoted by a minor proportion of alumina, the catalyst being prepared by forming a hydrous silica gel by introducing an alkali silicate solution into an excess of an acid and allowing the resulting mixture to set to a gel, water-washing said gel free of soluble material and partially drying to an extent so limited that the hydrous oxide composition of the gel is maintained, activating the resulting hydrous silica gel with an aqueous solution of a hydrolyzable aluminum salt and thereby causing adsorption of hydrous alumina on the silica gel in an amount corresponding to from 0.1 to 2 per cent of alumina by weight, and water washing and drying the treated gel, each said drying being conducted at a temperature not greater than the subsequent reaction temperature.

Better understanding of this invention will be obtained upon reference to the drawing which is a schematic flow diagram used in the process of this invention.

Referring particularly to the drawing, a naphthenic hydrocarbon stock boiling in the range of 150° F. to 300° F., preferably 220° F. to 300° F., is fed through inlet conduit 11 to hydroforming zone 12 together with hydrogen in a mol ratio of hydrogen to hydrocarbon as set forth above. The normal xylene formers or $C_8$ naphthenes, and minor amounts of ethylbenzene when naturally present, are contained in the fraction boiling within the range of 220° F. to 275° F. and naturally occurring xylenes are found in the fraction boiling within the range of 275° F. to 300° F. Thus, the product which is removed from hydroforming zone 12 through conduit 13 contains xylene product, together with the naturally occurring xylenes found in the original feed and higher and lower boiling materials. This product stream is passed to separation zone 14 wherein the stream is separated by a combination of fractionation and liquid-liquid extraction so as to take the hydrocarbon portion lower boiling than the xylenes off through conduit 15 and hydrocarbons higher boiling than the xylenes off through conduit 16.

A xylene concentrate with ethylbenzene, when present, is removed through conduit 17 to a second separation zone, preferably a crystallization zone 18.

The separation of para-xylene from the other isomeric xylenes by means of fractional crystallization is becoming well known in the art and one particular form of such a crystallization separation is disclosed in patents by Schmidt 2,617,274 and Arnold 2,540,977. It is preferred that the crystallization be carried out under such conditions that the crystals are continuously washed by an internal reflux of relatively pure para-xylene. However, when the crystallization separation is carried out in a stepwise process, the occluded mother liquor can be washed from the crystals by any of several liquid streams, such as an intermediate fraction or pure product. The pure para-xylene product can be removed from the crystallization zone through conduit 19 either as a melt or as a predominantly crystalline material or slurry. The crystallization temperature will ordinarily be between −70° F. and −115° F., depending on the composition of the feed and the desired approach to the eutectic temperature.

A stream comprising the motor liquor and, if utilized, the internal reflux material, or other reflux material, is removed from crystallization zone 18 through conduit 20. This stream is preferably passed through conduit 21 to isomerization zone 22 but a portion thereof may be passed through conduit 23 to hydroforming zone 12. In my process, I prefer to utilize isomerization zone 22 for the treatment of the mother liquor so as to isomerize the meta- and ortho-xylenes to additional para-xylenes. By using a separate isomerization zone I am able to maintain more flexibility in my process than when I return all of the mother liquor to the hydroforming zone wherein it is contacted with the reforming catalyst, together with the incoming fresh feed.

The catalyst which I use in my isomerization zone is a silica-alumina catalyst such as is prepared by the methods described by McKinney in U. S. Patents 2,142,324 and 2,147,985. In general, these catalysts are prepared by first forming a hydrous silica gel or jelly from an alkali-silicate and an acid, washing soluble material from the gel, treating or activating the gel with an aqueous solution of a suitable aluminum salt, and subsequently washing and drying the treated material. In this manner, a part of the aluminum, presumably in the form of a hydrous oxide or loose hydroxide compound formed by hydrolysis, is selectively adsorbed by the hydrous silica, and is not removed by subsequent washing. This selective adsorption is attested by a decrease in the aluminum content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. Whether prepared by this method or by some modification thereof, the catalyst will contain a major portion of silica, and a minor portion of aluminum oxide. This minor portion of alumina will generally not be in excess of 10 per cent by weight, and will more often, and generally more desirably, be between about 0.1 and 1.5 or 2 per cent by weight, on the dry basis.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of aluminum, with the sulfate or chloride being preferred. Other alternate salts include acetates and nitrates. The adsorption of the hydrous aluminum oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and alumina.

Modifications may be made in the foregoing procedure and catalysts of suitable activity may result. One obvious alternative is the addition of the aluminum salt to the silicate before gelation. This method enables the incorporation of greater proportions of aluminum oxide, but activity may not be proportional to increasing aluminum oxide contents above about 1 to about 15 weight per cent so that little is gained by the modification and the proper degree of salt and acid removal may be more difficult. Non-uniform materials usually result from the mechanical mixing of hydrous aluminum oxide and silica gels, so that catalysts prepared in this manner may be less satisfactory. Other means of accomplishing the preparation may be devised, however, in view of the foregoing description.

As indicated above, the finshed gel-type catalysts comprise essentially silica and alumina, with variant quantities of water. The aluminum oxide may be present in minor activating quantities of about 1 to about 15 weight per cent of the total oxides. In many instances, catalytic activity may be as great with about 1 to 5 per cent of aluminum oxide as with about 10 to 15 per cent. Still greater amounts up to about 50 weight per cent may be added if desired, although the physical characteristics and activity of the catalyst may be adversely affected. In order to retain the selectivity of the catalyst for the present reaction, other heavy metal oxides than those herein-below recited, or salts are usually absent from the starting materials and the finished gel. Oxides of metals of group IIIB and IVA of the periodic system may be incorporated with the silica and alumina if desired. For example, small quantities of zirconia may be used in addition to alumina for activating the silica gel. Such metal oxides may be added in the same ways discussed above with respect to aluminum oxide.

Because of the removal of para-xylene in crystallization zone 18, the xylene mixture charged to the isomerization zone or to the hydroforming zone, is below the thermodynamic equilibrium in para-xylene content. For this reason, a portion of the ortho-xylene and meta-xylene are converted to para-xylene, thus once again approaching the thermodynamic equilibrium in para-xylene content. A small amount of light and heavy hydrocarbons produced in the isomerization step is removed from isomerization zone 22 through line 24, together with other products and is returned to separation zone 14, preferably being combined with the feed stream passed to separation zone 14 through conduit 13. Thus, the materials lower boiling and higher boiling than the xylene fractions are separated therefrom and the xylene fraction is then passed to crystallization zone 18 wherein para-xylene is removed by freezing to crystallize out the para-xylene. When desired, hydrogen is introduced to isomerization zone 22 through conduits 26 and 21.

At times it may be desirable to return the mother liquor to the hydroforming zone as discussed above. For example, if the naphthene content of the original charge stock in line 11 is abnormally high and sufficient xylene concentrate is produced, overloading of the isomerization zone 22 results, then recycle of at least a portion of the mother liquor will permit adjustment of the feed to the isomerization zone to conform with its capacity.

In another modification, it may be desirable to produce a portion of ortho-xylene from the mixed xylene concentrate. Ortho-xylene may be used in the production of phthalic anhydride by oxidation and is thus at times a very desirable product. The boiling point of ortho-xylene is such that it can be separated from meta- and para-xylene by fractionation, although the boiling points are rather close, the difference thereof being about 9° F. As is well known, meta- and para-xylenes cannot be separated by fractionation because they have substantially the same boiling points. The process as originally described above, is modified to produce ortho-xylene and para-xylene with no production of meta-xylene, by separating at least a portion of ortho-xylene in separation zone 14 and removing it as an intermediate fraction through conduit 25. The xylene concentrate removed from conduit 17 then comprises substantially meta- and para-xylenes, with a very minor amount of ortho-xylene. The ortho- and para-xylenes are produced in a desired proportion by control of the amount of the ortho-xylene removed through line 24 and the amount of ortho-xylene passed through conduit 17 to crystallization zone 18. Thus, as substantially all of the ortho-xylene is removed through conduit 25 the mother liquor passed through conduit 20 to isomerization zone 22 contains practically no ortho-xylene, and meta-xylene will be isomerized to ortho- and para-xylene. However, where lesser amounts of ortho-xylene are desired, the undesired portion of ortho-xylene is passed through conduit 17 to crystallization zone 18 and is subsequently passed to isomerization zone 22 where it is converted to para-xylene.

When a greater proportion of ortho-xylene is desired than is produced in this manner, production of this compound is obtained in large amounts by removal of lesser amounts of para-xylene from the crystallization zone, either through cooling the mother liquor to a higher crystallization temperature or by passing only a portion of the xylene concentrate to the crystallization zone and passing the remainder plus the mother liquor to isomerization zone 22. Thus, by by-passing the crystallization zone entirely, ortho-xylene may be produced in large quantities.

I operate my separate isomerization chamber under isomerization conditions which include a temperature within the range of 600°–1000° F., preferably 700°–900° F., a pressure of from atmospheric to 1000 p. s. i. g., preferably atmospheric to 500 p. s. i. g., and a liquid hourly space velocity of 0.3–10, preferably 0.5–6. I have found that very surprisingly, I am able to obtain high yields of para-xylene in this separate isomerization zone without introducing hydrogen thereto. I can, however, when I so desire, utilize hydrogen in a mol ratio of hydrogen to hydrocarbon of 0 to 20:1. When hydrogen is present in the isomerization zone, any trace metals which act as hydrogenation or dehydrogenation catalysts tend to convert aromatics to naphthenes. Thus, by operating in the absence of added hydrogen, the conversion of aromatics to naphthenes is substantially eliminated.

Better understanding of this invention will be obtained upon study of the following specific example, which is presented as being exemplary and not with the idea of unduly limiting the scope of this invention.

EXAMPLE

The catalyst used in obtaining the following data is prepared by diluting 160 gallons of liquid sodium silicate having a composition of $Na_2O$—8.9 per cent, $SiO_2$—28.5 per cent, and water—62.6 per cent and a specific gravity of 41° Bé. with 240 gallons of water. 55 gallons of commercial sulfuric acid having a specific gravity of 66° Bé. is diluted to 21 per cent strength by the addition of 350 gallons of water. The silicate is added to the acid solution with vigorous thorough mixing, after which the mixture is allowed to set to a gel. The gel is a hydrated silicic acid, which is very porous. The gel is water washed until effluent wash water has a pH of about 1.5, after which the gel is air dried at 100°–120° F. at a rate of 3000 cubic feet per minute so as to shrink the gel to about 25 per cent of its original volume. The gel is then once again washed with water until the pH of the effluent water is 2.0 to 2.5, after which 250 pounds of iron free aluminum sulfate $(Al_2(SO_4)_3.18H_2O)$ is added thereto and is boiled gently with live steam for about 2 hours. The aluminum sulfate solution is then drained off, the gel is rinsed with water, the water is drained off and the gel is placed in a drying chamber and dried until the particles have become very hard and firm and have shrunk to about 12–15 per cent of the original volume of the gel. The gel is once again washed with water until the effluent wash water is substantially sulfate free and then dried to remove the added water therefrom.

Mother liquor feed obtained by the removal of para-xylene from a xylene concentrate in a crystallization zone and having the composition set forth below in Table I, was subjected to contact with a silica gel catalyst activated with 1.1 per cent alumina and prepared in the manner set forth in the next preceding paragraph. The contacting was obtained under the conditions set forth below in Table I with the para-xylene content of the product being 15.1 weight per cent as compared to 6.7 weight per cent of para-xylene in the mother liquor. Results of the conversion of the mother liquor and the operating conditions are set forth below in Table I.

Table I
RESULTS OF TEST

|  | Mother Liquor | Run |
|---|---|---|
| Test Conditions: | | |
| Temperature, ° F | | 754 |
| Pressure, p. s. i. g | | 15 |
| LHSV | | 0.87 |
| $H_2$/HC, mol | | none |
| Length of Run, hrs | | 2.55 |
| Total product analysis, wt. percent: | | |
| $CH_4$ | | |
| $C_2$ | | |
| $C_3$ | | 0.1 |
| $C_4$ | | |
| $C_5$ | | |
| $C_6$ (including benzene) | | 1.4 |
| Toluene fraction | 2.9 | 5.8 |
| p-xylene | 6.7 | 15.1 |
| m-xylene | 42.4 | 34.8 |
| o-xylene | 22.9 | 15.9 |
| ethylbenzene | 24.4 | 20.2 |
| heavier than xylene | 0.7 | 6.7 |
| naphthenes | | |
| Total | 100.0 | 100.0 |

Various modifications of this invention will be apparent to those skilled in the art upon study of the accompanying disclosure. Such modifications are believed to be within the spirit and the scope of this invention.

I claim:

1. The process of producing para-xylene which comprises introducing a naphtha boiling in the range of between 220° F. and 300° F. together with hydrogen in a hydrogen-hydrocarbon mol ratio of between 0.5–1 and 20–1 to contact with a reforming catalyst at a temperature within the range of between 700° F. and 1000° F., at a pressure of atmospheric to 1000 p. s. i. g., a liquid hourly space velocity of 0.3–10; separating a xylene concentrate from the effluent resulting from said contacting; cooling said xylenes to a temperature of between −70° F. and −115° F. so as to crystallize para-xylene from said concentrate; passing uncrystallized material to contact with a solid granular adsorbent contact catalyst consisting essentially of synthetic silica gel and from 0.1 to 2 per cent by weight of alumina at a temperature within the range of between 600° F. and 1000° F., at a pressure of atmospheric to 1000 p. s. i. g., and a liquid hourly space velocity of 0.3 to 10 said synthetic silica gel catalyst having been prepared by precipitating a hydrous silica gel and incorporating hydrous alumina therein by hydrolytic adsorption from a suitable aluminum salt solution while said gel is in the hydrous condition; and separating para-xylene from the resulting effluent.

2. A process for the production of para-xylene which comprises passing a mixture of meta- and ortho-xylene through a bed of solid granular adsorbent contact catalyst contained in a reaction zone and consisting essentially of synthetic silica gel promoted by a minor portion of alumina, said catalyst being prepared by forming a hydrous silica gel by introducing an alkali silicate solution into an excess of an acid and allowing the resulting mixture to set to a gel, water washing said gel free of soluble material and partially drying to an extent so limited that the hydrous oxide composition of the gel is maintained, activating the resulting hydrous silica gel with an aqueous solution of a hydrolyzable aluminum salt and thereby causing adsorption of hydrous alumina on the silica gel in an amount corresponding to from 0.1 to 2 per cent by weight of alumina, and water washing and drying the treated gel, each said drying being conducted at a temperature not greater than the subsequent reaction temperature, at a temperature within the range of 600° F. to 1000° F., at a pressure of atmospheric to 1000 p. s. i. g. and a liquid hourly space velocity of 0.2 to 10; and separating para-xylene from the resulting effluent.

3. The process of claim 2 wherein said temperature is within the range of 700° F. to 900° F.

4. The process of claim 2 wherein said pressure is within the range of atmospheric to 500 p. s. i. g.

5. The process of claim 2 wherein said liquid hourly space velocity is within the range of 0.5 to 6.

6. A process for the production of a xylene from an isomeric alkyl benzene which comprises subjecting such an alkyl benzene to an isomerization temperature while in the presence of a solid granular catalyst comprising silica promoted with not more than 2 per cent by weight of alumina and prepared by forming a hydrous silica gel by introducing an alkali silicate solution into an excess of an acid and allowing the resulting mixture to set to a gel, water washing said gel free of soluble material and partially drying to an extent so limited that the hydrous oxide composition of the gel is maintained, activating the resulting hydrous silica gel with an aqueous solution of a hydrolyzable aluminum salt and thereby causing absorption of hydrous alumina in the silica gel in an amount corresponding to not more than 2 per cent by weight of alumina, and water washing and drying the treated gel, each said drying being conducted at a temperature not greater than the subsequent reaction temperature, at a temperature within the range of 600° F. to 1000° F., at a pressure of atmospheric to 1000 p. s. i. g. and a liquid hourly space velocity of 0.2 to 10; and recovering a desired xylene from the resulting effluent.

7. The process of claim 6 wherein para-xylene is recovered from the resulting effluent.

8. The process of claim 6 wherein meta-xylene is recovered from the resulting effluent.

9. A process for the production of a xylene which comprises contacting an isomeric alkyl benzene under isomerizing conditions with a solid adsorbent contact catalyst consisting essentially of silica gel having deposited thereon hydrous alumina in the range of 0.1 to 2 per cent by weight by the steps comprising precipitating a hydrous silica gel and incorporating the alumina therein by hydrolytic adsorption from a suitable aluminum salt solution while said gel is in the hydrous condition.

10. The process of claim 9 wherein the feed to the process is obtained by separating para-xylene from a mixture comprising the three xylene isomers and the resulting meta- and ortho-xylene mixture is utilized as said feed.

11. The process of claim 9 wherein a mixture comprising principally ethyl benzene, meta-, and ortho-xylenes is utilized as the feed and para-xylene is separated from the effluent as a product.

References Cited in the file of this patent

UNITED STATES PATENTS

| | | |
|---|---|---|
| 2,142,324 | McKinney | Jan. 3, 1939 |
| 2,403,575 | Reeves | July 9, 1946 |
| 2,532,276 | Birch | Dec. 5, 1950 |
| 2,656,397 | Holzman et al. | Oct. 20, 1953 |